(No Model.) 3 Sheets—Sheet 1.
J. Q. ADAMS.
STALK CUTTER.
No. 353,010. Patented Nov. 23, 1886.
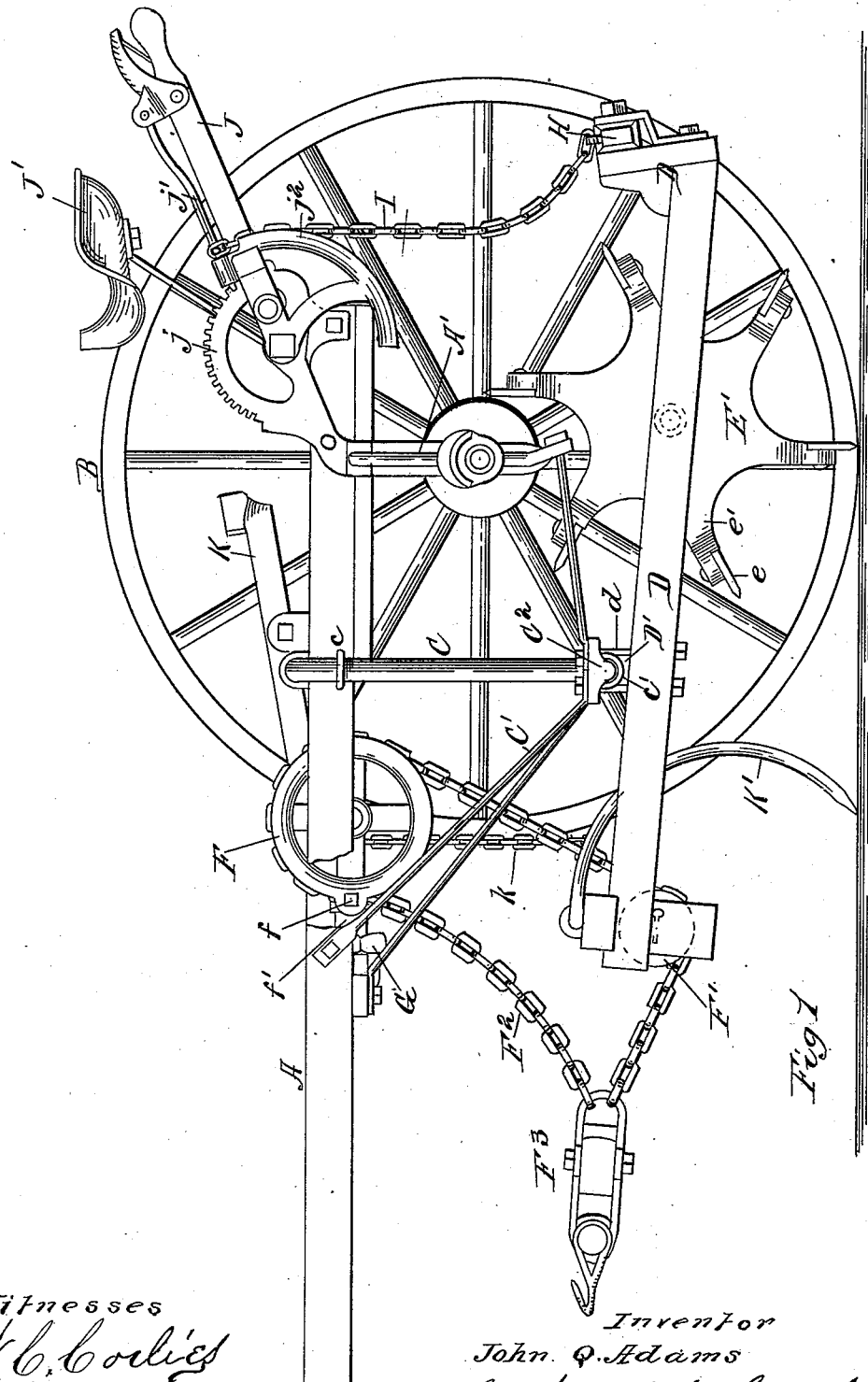
Witnesses
W. C. Corlies
A. M. Best
Inventor
John Q. Adams
By Coburn & Thacher
Attorneys (No Model.) 3 Sheets—Sheet 2.
J. Q. ADAMS.
STALK CUTTER.
No. 353,010. Patented Nov. 23, 1886.
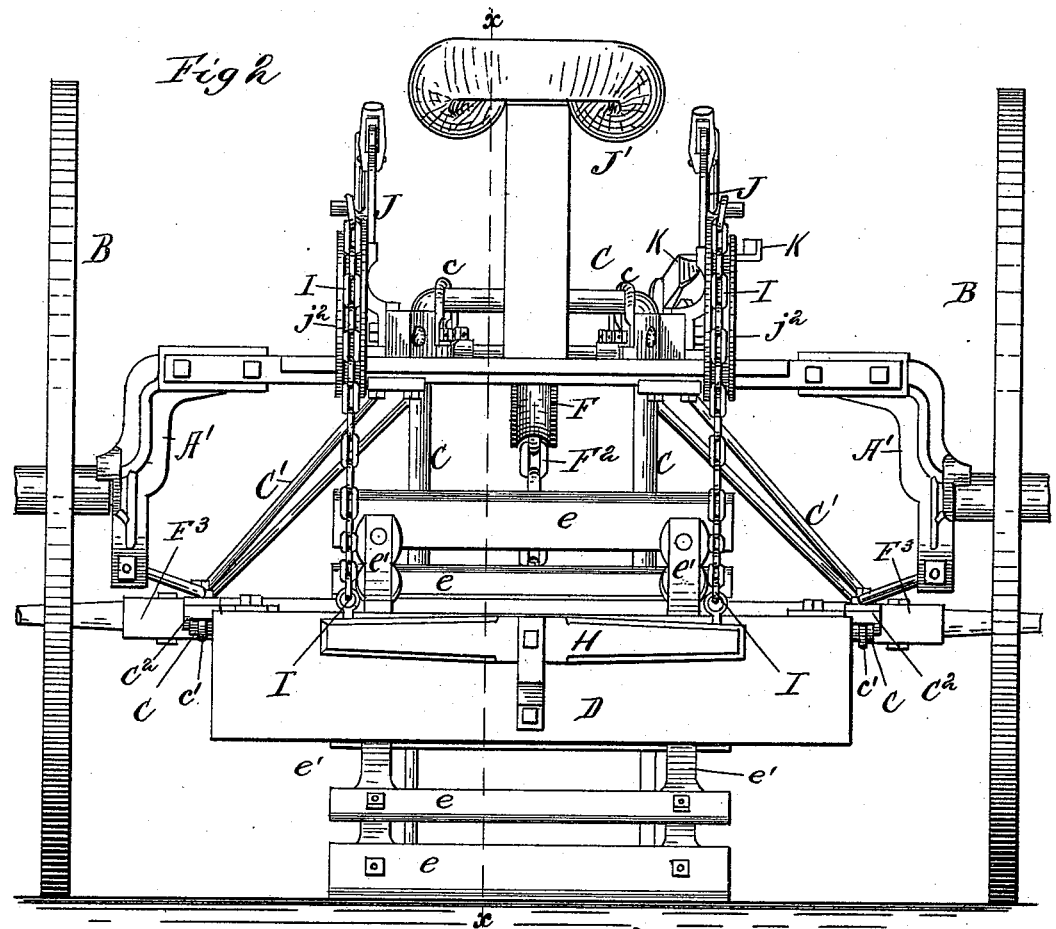
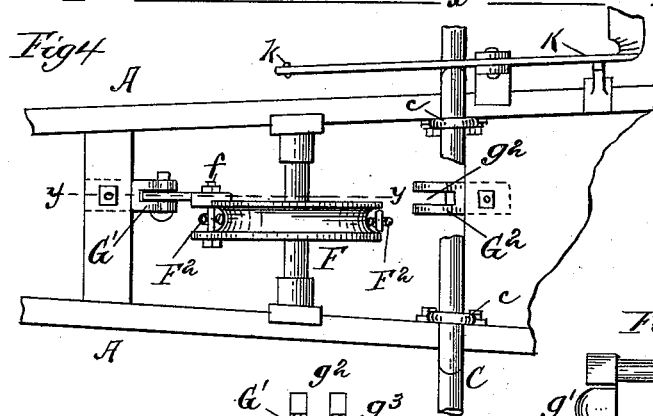
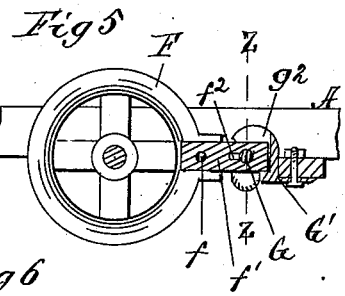
Witnesses
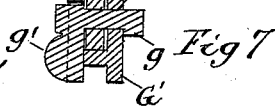
Inventor
John Q. Adams
By Coburn & Thacher
Attorneys (No Model.)  3 Sheets—Sheet 3.
J. Q. ADAMS.
STALK CUTTER.
No. 353,010.  Patented Nov. 23, 1886.
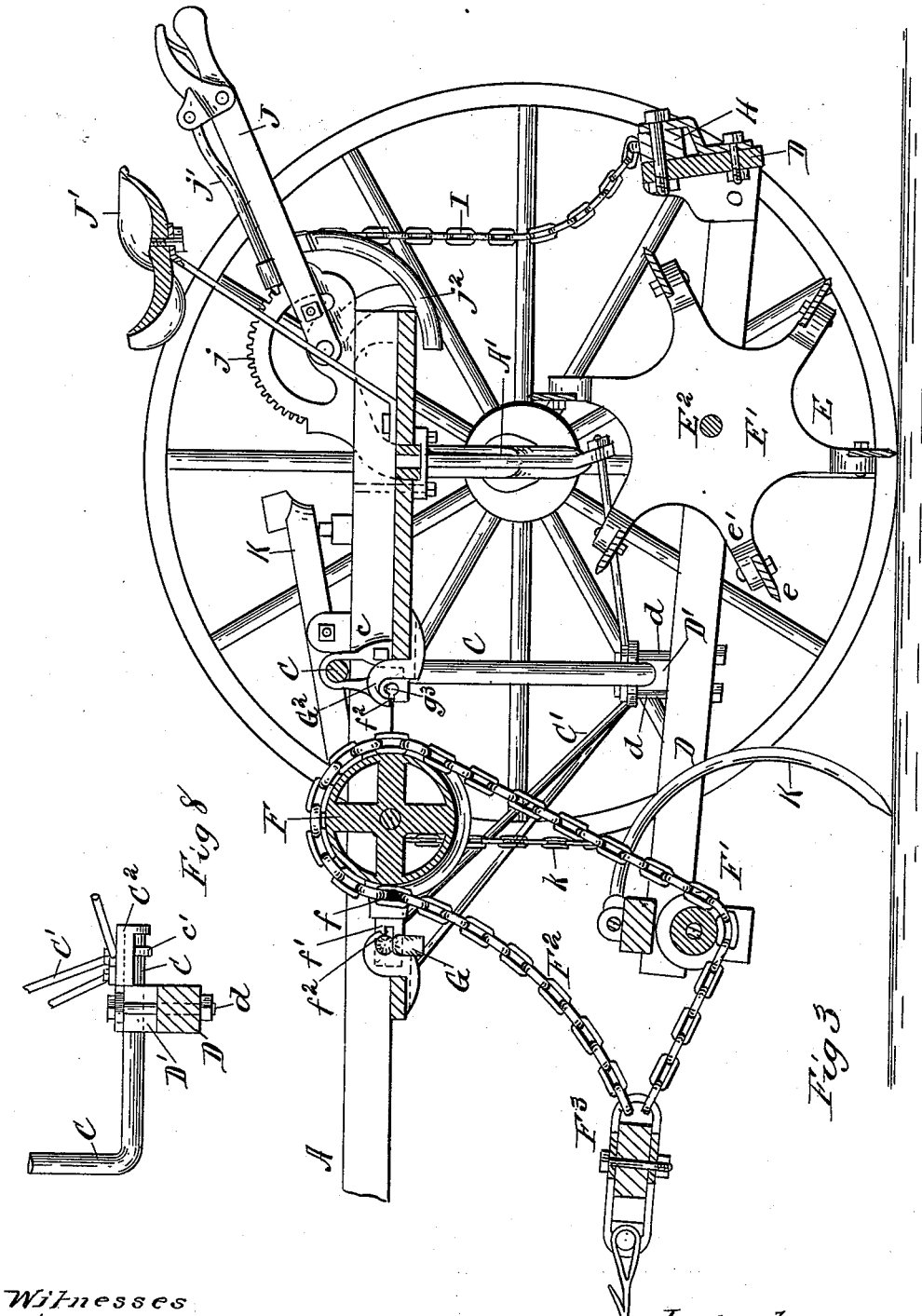
Witnesses
W. C. Coolies
A. M. Best
Inventor
John Q Adams
By Coburn & Thacher
Attorneys

UNITED STATES PATENT OFFICE.

JOHN Q. ADAMS, OF MARSEILLES, ILLINOIS.

STALK-CUTTER.

SPECIFICATION forming part of Letters Patent No. 353,010, dated November 23, 1886.

Application filed June 3, 1886. Serial No. 204,091. (No model.)

*To all whom it may concern:*

Be it known that I, JOHN Q. ADAMS, a citizen of the United States, residing at Marseilles, in the county of La Salle and State of Illinois, have invented a certain new and useful Improvement in Stalk-Cutters, which is fully set forth in the following specification, reference being had to the accompanying drawings, in which—

Figure 1 is a side elevation of a stalk-cutter embodying my invention, one of the wheels being removed; Fig. 2, a rear elevation of the same; Fig. 3, a longitudinal sectional view taken on the line $x\ x$ of Fig. 2; Fig. 4, a detail plan view of the forward part of the upper or main frame; Fig. 5, a detail sectional view of the same, taken on the line $y\ y$ of Fig. 4; Fig. 6, detail views of the locking-pin; Fig. 7, a detail sectional view taken on the line $z\ z$ of Fig. 5; and Fig. 8, a detail sectional view along one end of the yoke.

Like letters refer to like parts in all the figures of the drawings.

My invention relates to stalk-cutters, and more particularly to that class of machines which is designed to be drawn across the field, by horse or other power, to cut the stalks into suitable lengths as they lie upon the ground, so that they may be readily plowed under.

I will now proceed to describe a construction in which I have practically carried out my invention in one form, and will then point out more particularly in the claims those features which I deem to be new and desire to protect by Letters Patent.

In the drawings, A represents the main frame or branching pole, which is provided with the downwardly-bent axles A', to receive the wheels B, on which the machine is mounted. The main frame A is provided with a depending yoke, C, which is secured thereto by means of clips $c$, or in any other suitable manner. This yoke resembles in its general form an inverted U, its extremities being carried down vertically and then bent outward at right angles, to form bearings upon which the cutter-frame is pivoted. These outer extremities are preferably strengthened by means of braces C', which are connected to the main frame, as shown, at one end, and at the other end secured to a casting, C², which is clamped on the extremity of the yoke by means of a U-shaped bolt, $c$, or by other suitable means.

The cutter-frame D is, as above stated, hung or pivoted upon the horizontal extremities of the yoke C, this connection being preferably effected in the manner shown in Fig. 8 of the drawings, in which D' represents a box loosely surrounding the said portion of the yoke and secured to the cutter-frame by means of bolts $d$. It is of course understood that this construction is identical on both sides of the machine. The cutter-frame D is pivoted to the yoke at a point some little distance from the rear of its front end, and the cutter E is mounted in the said frame at a point in the rear of this point of connection. This cutter may be of any suitable construction, the form I prefer being that shown in the drawings, in which the knives $e$ are mounted upon radial arms $e'$, projecting from disks E', attached to a shaft, E², which revolves in suitable bearings in the cutter-frame.

F indicates a sheave or wheel, which is mounted in the main frame between the arms of the branching pole, and F' a similar sheave or wheel mounted in the extreme forward end of the cutter-frame D. A chain, F², passes around these two sheaves, as shown more particularly in Figs. 1 and 3, its ends being attached to the double-tree F³ in any suitable manner. The chain F² is permanently connected to the sheave F by means of a pin, $f$, passing through the flanges of the sheave and through one of the links of the chain, as shown more particularly in Fig. 4 of the drawings. The sheave F is provided with a radial arm, $f'$, extending beyond its periphery, and having at its outer extremity an aperture, $f^2$, shaped as shown, through which the locking-pin G passes. This locking-pin is preferably identical with that set forth in Letters Patent No. 257,993, granted to me May 16, 1882, being provided with a lug, $g$, and with a weighted arm, $g'$. The main frame A is provided at a point in front of the sheave F with a lug, G', and in the rear of the said sheave with a lug, G², these lugs being slotted, as shown at $g^2$, to receive the end of the arm $f'$ within the said slot, and being provided with an aperture, $g^3$, similar to the aperture $f^2$, to receive the locking-pin G. When the parts are in the position shown in the drawings, the arm $f'$ is locked, by means of the pin G, between the arms of the lug G' in front of the sheave F. By rotating the said locking-pin and withdrawing it the sheave F may be turned one-half of a revolution, and the arm $f$ locked between the arms of the rear lug, $G^2$, in a similar manner.

H represents an evener, pivoted at its center to the rear of the cutter-frame D, and having connected to each of its ends a lifting-chain, I. Each lifting-chain is connected at its upper end to a hand-lever, J, pivoted to the main frame, and arranged within convenient reach of the driver while in position in the driver's seat J'. The levers J are provided with the usual locking-segment, $j$, and spring-pawl $j'$, for engaging the same with a segmental guide, $J^2$, for the lifting-chains I, these features needing no detailed description, as any approved form may be employed.

K indicates a foot-lever pivoted to the main frame, and provided with a lifting-chain, $k$, by means of which the drag-hooks K' may be raised or lowered, as in my said patent hereinbefore referred to.

The operation of my improved stalk-cutter is as follows: The several parts of the machine being in the position shown, with the sheave F locked in the forward lug, G', and the levers J thrown back, it will be seen that the cutter E will be in a position to sever the stalks as they rest upon the ground. By means of the draft attachment hereinbefore described the draft of the horses is caused to throw the forward part of the cutter-frame upward, and the rear portion thereof, which carries the cutter, downward, thus giving the cutter a downward thrust and rendering it unnecessary to employ heavy knife-heads in order to make it cut. At the same time the draft attachment not only operates to throw part of the weight of the main frame of the machine and of the driver upon the knives, but at the same time the draft is so low as to take the weight of the tongue off the horses' necks. It will also be observed that while the cutter and cutter-frame are free to accommodate themselves to all inequalities of the ground, the action of the draft to force them downward and give them a heavy cut remains the same. These results follow when the sheave F is locked in its forward position; but when it is turned backward the relation of the parts of the draft-chain will be changed. The section passing around the sheave F', which is the ordinary draft-section, obviously will be unwound from the sheave F, while the section between the point of attachment to the sheave F and the double-tree will be wound upon the latter sheave. This practically changes the line of draft, for the main draft-section is practically lengthened, so as to be slack, while the other section is shortened, thereby drawing up the double-tree under the tongue and changing the draft substantially to this section. This change is effected whenever the rear end of the cutter-frame is raised, as hereinafter described, so as to lift the cutter from the ground for traveling upon the road, and the sheave may be secured in this adjusted position by fastening its radial arm to the rear slotted lug. The weight and draft will be taken almost entirely from the tongue in this position, and the latter will rest easily in the neck-yoke.

By employing the two levers J, connected to the rear end of the cutter-frame through the medium of the equalizer H, I am enabled to raise the cutter-frame with a much less expenditure of power than if a single lever and chain connected directly to the said frame were employed, for it will readily be perceived that by throwing forward one of the said levers the equalizer H moves upon the lower extremity of the other chain, I, as a fulcrum, thus obtaining a considerable increase in the leverage, and when this lever J has been thrown forward to the desired extent and locked the other lever may be similarly brought forward, thus lifting the cutter-frame to an extent equal to the lift of the first lever. Briefly expressed, this arrangement renders it possible to lift only one-half of the weight of the frame at a time, thus rendering it easy for the driver to raise the frame while sitting in the driver's seat.

It is obvious that although I have shown and described my preferred form of mechanism for raising and lowering the cutter-frame, other mechanism may be employed for this purpose without departing from the principle of my invention.

It is also obvious that various modifications in the details of construction may be made without departing from the principle of my invention; and I therefore do not wish to be understood as limiting myself strictly to the precise details hereinbefore described, and shown in the drawings.

Having thus described my invention, what I claim as new, and desire to secure by Letters Patent, is—

1. In a stalk-cutter, a main or supporting frame, in combination with a cutter-frame mounted on pivotal supports back of its front end, and a draft device connected to the cutter-frame and arranged to tilt the cutter-frame and cutter downward by the operation of the draft, substantially as and for the purposes specified.

2. In a stalk-cutter, a main or supporting frame, in combination with a cutter-frame mounted on pivotal supports, and a draft device connected to the cutter-frame, and adjustable to raise and lower the point of draft, substantially as and for the purposes specified.

3. In a stalk-cutter, a main or supporting frame, in combination with a cutter-frame mounted on pivotal supports back of its forward end, a draft-chain composed of two sections, one of which is connected to the forward end of the cutter-frame and the other passes directly to the double-tree, and an adjusting device whereby the relative working-lengths of the two sections may be changed to change the line of draft to apply it to or take it from the cutter-frame, substantially as and for the purposes specified.

4. In a stalk-cutter, the combination, with the main frame and the cutter-frame pivoted thereto at a point between the cutter and the forward end of the cutter-frame, of the draft-chain secured to the main frame and passing under a sheave on the forward end of the cutter-frame, substantially as and for the purposes specified.

5. In a stalk-cutter, the combination, with the main frame and cutter-frame pivoted thereto, of the draft-chain having its ends secured to the draft apparatus and passing under a sheave on the cutter-frame and over a sheave on the main frame, to which latter sheave it is attached, said sheave being provided with locking devices whereby it may be locked either to the front or rear, substantially as and for the purposes specified.

6. The combination, with the draft-chain $F^2$, of the sheave F, to which it is connected, the said sheave being provided with the apertured radial arm $f'$, the slotted and perforated lugs $G'$ $G^2$, arranged in front and rear of said sheave, and the removable locking-pin G, substantially as and for the purposes specified.

7. In a stalk-cutter, the combination, with the main frame and the cutter-frame pivoted thereto, of the evener pivoted to the cutter-frame, and the lifting-levers suitably connected with the extremities of the evener, substantially as and for the purposes specified.

8. In a stalk-cutter, the combination, with the main frame and the cutter-frame pivoted thereto near its forward end, of the evener H, pivoted centrally to the rear of the cutter-frame, and the lifting-levers J, connected to the extremities of the said evener by means of chains I, and provided with suitable locking devices, substantially as and for the purposes specified.

JOHN Q. ADAMS.

Witnesses:
CHAS. N. WARD,
H. R. ADAMS.